Patented June 25, 1935

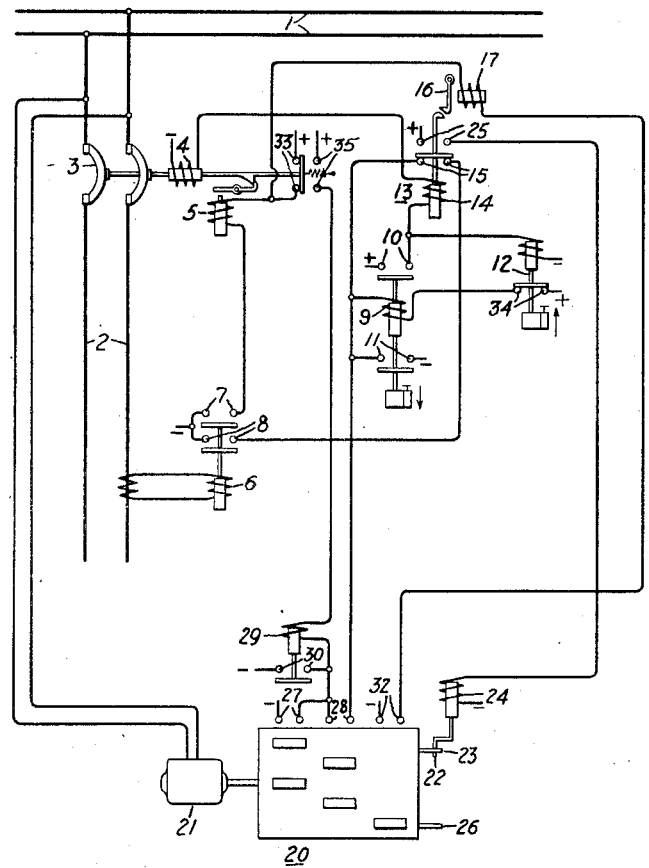

2,006,254

UNITED STATES PATENT OFFICE 2,006,254

AUTOMATIC RECLOSING CIRCUIT BREAKER SYSTEM

Arvid E. Anderson, Drexel Hill, Pa., assignor to General Electric Company, a corporation of New York Application August 23, 1934, Serial No. 741,085

8 Claims. (Cl. 175—294)

My invention relates to automatic reclosing circuit breaker systems and particularly to such systems in which a circuit breaker interconnecting two electric circuits is reclosed substantially instantaneously after the initial opening thereof has been effected in response to a fault on one of the circuits.

In systems of the type above referred to, it has been the practice heretofore to initiate the instantaneous reclosing operation of the circuit breaker in response to the closing of auxiliary contacts on the circuit breaker when it opens. Due to the time it takes the circuit breaker to open and also the appreciable time it takes for the currents to build up in the circuit breaker closing coil and the auxiliary control relay which is usually employed to complete the closing coil circuit, I find that in some cases when such an arrangement is used the time interval between the initial opening and reclosure of the circuit breaker is longer than it is desired to have it. One object of my invention is to provide an improved arrangement of parts whereby this time interval between the opening and reclosure of the circuit breaker is materially reduced.

In accordance with my invention, I accomplish this result by initiating the instantaneous reclosing operation before the circuit breaker has completed its opening operation. Preferably this result is obtained by having the fault responsive means which effects the opening of the circuit breaker also effect a completion of the circuit of the electroresponsive means which initiates the closing operation.

My invention will be better understood from the following description when taken in connection with the accompanying drawing, the single figure of which diagrammatically illustrates an automatic reclosing circuit breaker system embodying my invention, and its scope will be pointed out in the appended claims.

Referring to the drawing, I represents a supply circuit which is arranged to be connected to a load circuit 2 by a circuit breaker 3. In order to simplify the disclosure, I have shown single phase circuits, but it is obvious that my invention is applicable also to direct current and polyphase circuits. The circuit breaker 3 may be of any suitable type, examples of which are well known in the art. In the particular arrangement shown, the circuit breaker 3 is of the well known latched-in type and is provided with a closing coil 4 which, when energized, effects the closing of the circuit breaker and with a trip coil 5 which, when energized, effects the opening of the circuit breaker.

For effecting the opening of the circuit breaker 3 when it is closed and a fault occurs on the load circuit 2, I provide suitable fault responsive means, shown as an overcurrent relay 6, which is connected in any suitable manner so as to be energized in accordance with the current flowing through the circuit breaker 3. When the current supplied to the load circuit 2 exceeds a predetermined value, the overcurrent relay 6 closes its contacts 7 to complete an energizing circuit for the trip coil 5 to effect the opening of the circuit breaker 3.

In accordance with my invention, the overcurrent relay 6 also initiates the closing operation of the circuit breaker 3 before it has completed its opening operation. This result is obtained by having the closing of the contacts 8 of relay 6 complete an energizing circuit for the control relay 9 which in turn, by closing its contacts 10, completes an energizing circuit for the closing coil 4 of the circuit breaker 3. In order to maintain the relay 9 energized during the closing operation, after the circuit breaker 3 opens and the overcurrent relay 6 opens the contacts 8, the relay 9 by closing its contacts 11 is arranged so that it completes a locking circuit for itself. This locking circuit is maintained closed for a sufficient length of time to allow the breaker to close, at which time it is interrupted by a time relay 12 which is energized in response to the closing of the contacts 10 of relay 9.

In order to limit the number of instantaneous reclosures of the circuit breaker 3 to one, a lockout relay 13 is provided which is arranged so that after the initial reclosure, it maintains the instantaneous reclosing circuit for the relay 9 open for a predetermined time interval if the circuit breaker 3 remains closed and permanently open if the circuit breaker is open at the expiration of this predetermined time interval. As shown, the operating coil 14 of this lockout relay 13 is connected in series with the closing coil 4 of the circuit breaker 3. The operating coil 14, when energized, opens the contacts 15 which are in series with the contacts 8 of the overcurrent relay 6 in the instantaneous closing circuit for relay 9. The relay 13 is arranged in any suitable manner so that it is held in its energized position after the operating coil 14 is deenergized. In the particular arrangement shown, this result is obtained by means of a latch 16 which holds the relay in its energized position and which is arranged to be released by a release coil 17 when it is energized. For resetting the relay 13 to its normal position, a circuit is arranged to be completed for the release coil 17 in a manner hereinafter described, in case the circuit breaker 3 is closed at the expiration of a predetermined time interval after the initial opening thereof.

I also provide additional reclosing means, of any suitable type, examples of which are well known in the art, for effecting the reclosing of the circuit breaker 3 a predetermined number of times with relatively long time intervals between successive reclosures in case the circuit breaker does not remain closed after the initial reclosure therefor. As shown, this additional reclosing means includes a timer 20 and a driving motor 21 therefor, which is permanently connected to a suitable source of current such as the supply circuit 1. The motor 21 is normally prevented from rotating by a stop 22 which engages a projection 23 on the rotatable element of the timer. The stop 22 is arranged to be moved out of engagement with the projection 23 by a release magnet 24, an energizing circuit for which is completed through contacts 25 of the lockout relay 13 when it is in its energized position. The stop 22 is also arranged to engage another projection 26 on the rotatable element of the timer if the release magnet 24 is energized when the timer has reached a predetermined position after having effected a predetermined number of reclosures. This position of the timer is called the lockout position, and when the timer is held in this position by the stop 22, further operation of the timer is prevented.

The timer 20 is provided with two sets of contacts 27 and 28, which are arranged to be closed a plurality of times in a predetermined sequence as the timer rotates. The timer is arranged so that only one of these two sets of contacts is closed at any given time. When the contacts 27 are closed, a circuit is completed for a control relay 29 if the circuit breaker 3 is open, and the relay 29, by closing its contacts 30, completes a locking circuit for itself so that when the contacts 27 of the timer are subsequently opened, the relay 29 remains energized as long as the circuit breaker 3 remains open. When the contacts 28 are closed and the relay 29 is energized a circuit is completed through the contacts 30 and 28 for the relay 9 to effect the closing of the circuit breaker 4.

The timer 20 is also provided with a third set of contacts 32 which are arranged to be closed after the timer has been in operation for a predetermined time interval and has effected the closing of the contacts 27 and 28 a predetermined number of times. The contacts 32 are connected in a circuit for the release magnet 17 of the lockout relay 13 so that this magnet is energized to reset the lockout relay to its normal position if the circuit breaker 3 is closed at the same time the contacts 32 are closed.

The operation of the arrangement shown in the drawing is as follows: Under normal load conditions the circuit breaker 3 remains closed and the control devices are in the positions shown. When an overload occurs which is sufficient to cause the overcurrent relay 6 to close its contacts, a circuit is completed through the contacts 7 of this relay and the auxiliary contacts 33 on the closed circuit breaker 3 for the trip coil 5 which, when energized, effects the opening of the circuit breaker 3. At the same time an energizing circuit is completed for the relay 9 through the contacts 8 of relay 6, contacts 15 of lockout relay 13 and contacts 34 of relay 12. By closing its contacts 11, relay 9 completes a locking circuit for itself around the contacts 8 and 15 and by closing its contacts 10, it completes a series energizing circuit for the closing coil 4 of the circuit breaker 3 and the operating coil 14 of relay 13. The energization of the closing coil 4 closes the breaker 3 so as to reconnect the load circuit 2 to the supply circuit 1.

Due to the time constants of the circuits of the relay 9 and the closing coil 4, as well as the inertia of the relay and circuit breaker mechanism, the circuit breaker 3 has sufficient time to interrupt the circuit before the closing coil 4 is sufficiently energized to reclose the circuit breaker. By properly designing the circuits of the relay 9 and the closing coil 4, the proper time constants can be obtained whereby the time interval elapsing between the initial opening of the circuit breaker 3 and the reclosing thereof may be varied over a relatively wide range.

The energization of the operating coil 14 of the lockout relay 13 opens the contacts 15 in the instantaneous closing circuit for the relay 9 so that if the circuit breaker 3 should open immediately after its initial reclosure, the relay 9 is not immediately reenergized to effect another instantaneous reclosure of the circuit breaker. The closing of the contacts 10 of the relay 9 also completes an energizing circuit for the relay 12 which, after being energized for a predetermined time sufficient to allow the circuit breaker 3 to close, opens the contacts 34 in the circuit of the relay 9.

The energization of the operating coil 14 of the lockout relay 13 also effects the closing of the contacts 25 in the energizing circuit of the release magnet 24 of the timer 20. The timer 20 then starts to rotate and a predetermined time thereafter closes its contacts 27. If the circuit breaker 3 fails to remain closed after the initial reclosure thereof so that its auxiliary contacts 35 are closed at the same time the timer contacts 27 are closed, a circuit is then completed for relay 29 which, by closing its contacts 30, completes a locking circuit for itself. When the timer 20 subsequently closes its contacts 28, a circuit is completed for the relay 9 through the contacts 34 of relay 12 and contacts 30 of relay 29. Relay 9 then effects the closing of the circuit breaker 3 in the manner above described.

If, after the second reclosure, the circuit breaker 3 fails to remain closed, the timer 20 effects after a predetermined time interval a third reclosure in the same manner as the second reclosure was effected. If the circuit breaker fails to remain closed after the third reclosure, release magnet 24 is energized when the timer reaches its lockout position. Therefore the stop 22 will engage the projection 26 on the timer and hold it in its lockout position.

If, however, the circuit breaker 3 remains closed after any reclosure so that it is still closed when the timer contacts 32 are closed, a circuit is then completed through these contacts 32 and the auxiliary contacts 33 on the closed circuit breaker 3 for the release magnet 17 which when energized resets the lockout relay 13. Since under these conditions the contacts 25 of the lockout relay 14 will be open when the timer 20 reaches its lockout position, the release magnet 24 will be deenergized. Consequently, the stop 22 does not engage the projection 26 in the lockout position and the timer 20 moves through this position to its normal position in which the projection 23 engages the stop 22.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, two electric circuits, a circuit breaker interconnecting said circuits, and means for effecting a substantially instantaneous reclosure of said circuit breaker including fault responsive means for effecting the opening of said circuit breaker and means controlled by said fault responsive means for initiating the closing operation of said circuit breaker prior to the opening thereof.

2. In combination, two electric circuits, a circuit breaker interconnecting said circuits, closing means for said circuit breaker including a winding arranged when energized to initiate the closing operation of said circuit breaker, opening means for said circuit breaker including a second winding arranged when energized to initiate the opening operation of said circuit breaker, and fault responsive means for simultaneously completing energizing circuits for both of said windings to effect a substantially instantaneous reclosure of said circuit breaker.

3. In combination, two electric circuits, a circuit breaker interconnecting said circuits, closing means for said circuit breaker including a winding arranged when energized to initiate the closing operation of said circuit breaker, fault responsive means for effecting the opening of said circuit breaker, and means for effecting a substantially instantaneous reclosure of said circuit breaker including means for completing an energizing circuit for said winding prior to the opening of said circuit breaker.

4. In combination, two electric circuits, a circuit breaker interconnecting said circuits, closing means for said circuit breaker including a winding arranged when energized to initiate the closing operation of said circuit breaker, opening means for said circuit breaker including a second winding arranged when energized to initiate the opening operation of said circuit breaker, and an overcurrent relay for simultaneously completing energizing circuits for both of said windings.

5. In combination, two electric circuits, a circuit breaker interconnecting said circuits, means for effecting a substantially instantaneous reclosure of said circuit breaker including fault responsive means for effecting the opening of said circuit breaker, and means controlled by said fault responsive means for initiating the closing operation of said circuit breaker prior to the opening thereof, and means for effecting after the initial reclosure additional reclosures of said circuit breaker with a relatively long time interval between each opening and the next reclosure.

6. In combination, two electric circuits, a circuit breaker interconnecting said circuits, closing means for said circuit breaker including a winding arranged when energized to initiate the closing operation of said circuit breaker, a fault responsive means for effecting the opening of said circuit breaker, means for effecting a substantially instantaneous reclosure of said circuit breaker including means for effecting the energization of said winding prior to the opening of said circuit breaker, and means for effecting after the initial reclosure of said circuit breaker additional reclosures of said circuit breaker with a relatively long time interval between each opening and the next reclosure.

7. In combination, two elelctric circuits, a circuit breaker interconnecting said circuits, closing means for said circuit breaker including a winding arranged when energized to initiate the closing operation of said circuit breaker, opening means for said circuit breaker including a second winding arranged when energized to initiate the opening operation of said circuit breaker, an overcurrent relay for simultaneously completing energizing circuits for both of said windings, and means for effecting after the initial reclosure of said circuit breaker additional reclosures of said circuit breaker with a relatively long time interval between each opening and the next reclosure.

8. In combination, two electric circuits, a circuit breaker interconnecting said circuits, and means for effecting a substantially instantaneous reclosure of said circuit breaker including a fault responsive means for effecting the opening of said circuit breaker and means controlled by said fault responsive means for initiating a closing operation of said circuit breaker simultaneously with the initiation of the opening operation.

ARVID E. ANDERSON.

DISCLAIMER 2,006,254.—*Arvid E. Anderson*, Drexel Hill, Pa. AUTOMATIC RECLOSING CIRCUIT BREAKER SYSTEM. Patent dated June 25, 1935. Disclaimer filed May 6, 1942, by the assignee, *General Electric Company*.

Hereby enters this disclaimer of claims 4 and 7 of said patent.

[*Official Gazette June 2, 1942.*]